United States Patent
Adachi

[19]

[11] Patent Number: 5,882,554
[45] Date of Patent: Mar. 16, 1999

[54] METHOD FOR EXPOSING OPTICAL MASTER DISK

[75] Inventor: Tadashi Adachi, Tokyo, Japan

[73] Assignee: NEC Corporation, Japan

[21] Appl. No.: 662,696

[22] Filed: Jun. 13, 1996

[30] Foreign Application Priority Data

Jun. 15, 1995 [JP] Japan ................................ 7-148926

[51] Int. Cl.[6] ........................... B29D 11/00; B29D 17/00
[52] U.S. Cl. ..................... 264/1.33; 264/1.37; 264/400; 264/482
[58] Field of Search ................................ 264/1.33, 1.37, 264/2.5, 400, 482; 369/116; 219/121.61, 121.62, 121.67

[56] References Cited

FOREIGN PATENT DOCUMENTS 63-149846 6/1988 Japan .
63-247928 10/1988 Japan .
2-73543 3/1990 Japan .

Primary Examiner—Mathieu D. Vargot
Attorney, Agent, or Firm—Hayes, Soloway, Hennessey, Grossman & Hage, P.C.

[57] ABSTRACT

An apparatus for exposing an optical master disk includes an exposure section, an exposure control section, a guide groove exposure voltage supplier and a modulator. The exposure section is for exposing a guide groove and pre-pits by different laser beams, and the exposure control section is for controlling an exposure voltage of the laser beams in the exposure section and an exposure timing. The guide groove exposure voltage supplier is for supplying, in accordance with the pre-pit designation signal, to the exposure section a guide groove exposure voltage of a first power level when an inside or an outside guide groove adjacent to the pre-pits is exposed and a guide groove exposure voltage of a second power level when a guide groove not adjacent to the pre-pits is exposed. The modulator modulates a laser beam for exposing the guide groove in accordance with the guide groove exposure voltage. In this way, the groove shape of the guide groove adjacent to the pre-pits and that of the guide groove not adjacent to the pre-pits are made uniform.

3 Claims, 3 Drawing Sheets

METHOD FOR EXPOSING OPTICAL MASTER DISK

BACKGROUND OF THE INVENTION (1). Field of the Invention

The present invention relates to an optical master disk exposure apparatus and method, and more particularly to an apparatus and a method for use in producing an optical disk medium having high signal quality.

(2). Description of the Related Art

An optical disk has a plurality of concentric or spiral guide grooves and a plurality of pre-pits. Such data as address data are recorded as pre-pits in a region being sandwiched between two grooves adjacent to each other. For providing an optical disk having high signal quality, it is necessary that the shapes of the guide grooves adjacent to the pre-pits and the shapes of the guide grooves not adjacent to the pre-pits be made uniform in the entire region of the surface of the disk, and also that cross-talk to a track adjacent to the pre-pits be substantially reduced. There are demands for an optical master disk exposure method and apparatus which enables the production of such an optical disk as explained.

Optical disks, with which data can be written, erased and read using a laser beam, have excellent characteristics as high capacity memory devices because of their high recording density. Expanded application thereof is being widely researched and developed in fields of such memory devices as for code data and image data.

With recording density increase of such optical disks, the data formats employed are such formats as an LTF (Logical Track Format) and a zone CAV (Constant Angular Velocity) as ISO formats of 5.25-inch and 3.5-inch optical disks in which the linear recording density is made uniform over the entire disk surface. In these formats, pre-pits are not all oriented in a particular central angular direction in the disk surface.

In an exposure apparatus for an optical master disk in which such data as address data are recorded as pre-pits in a region defined between two concentric or spiral guide grooves, the guide grooves and the pre-pits are exposed by using different laser beams. Such an apparatus is called a two-beam exposure. In another well-known technique, the power of the laser beam used for the guide groove exposure is set to different levels for guide grooves adjacent to pre-pits and those not adjacent to pre-pits. By so doing, the guide grooves adjacent to pre-pits and those not adjacent to pre-pits are made uniform in their shapes, thus improving the signal quality of the groove.

For example, in the arrangement disclosed in Japanese Patent Application Kokai Publication No. Hei 2-73543, the exposure of address bits for writing track numbers and sector numbers with respect to the optical master disk is made by a first laser beam and the exposure of V-shaped guide grooves for tracking is made by a second laser beam which is arranged so as to be spaced from the first laser beam by one half of the track pitch and in parallel with the first laser beam. The exposure of the V-shaped guide grooves is performed such that the power of the exposure laser applied to the portion where there are address bits is reduced from that applied to the portion where there are no address bits. In this way, it is possible to prevent the film thickness from being reduced at the two side portions of the pits.

Also, Japanese Patent Application Kokai Publication No. Sho 63-149846 discloses an arrangement wherein one groove is formed by the exposure of a photoresist film with a plurality of laser beams whose centers deviate from one another and being disposed so as to overlap one over another. In this way, even when the depth of the guide groove is less than the thickness of the photoresist film, the groove can be formed so as to have a nearly rectangular flat bottom.

From the optical master disk which has been exposed in the above way, a stamper used to form optical disk media is produced using steps such as development, electro-casting and polishing.

The optical disks which are obtained in the above way are already at a practical application level in code data file memory fields and, also for still image and movie image data fields. The application of the optical disks is expected to be further expanded and diversified in multimedia fields.

With the increase in the application of these optical disks, recording density improvement or further operation speed increase is expected through, for example, a reduction of the inter-guide groove interval.

When a stamper produced by using an optical master disk produced by the above prior art exposure method is used to produce an optical disk medium having a data format in which pre-pits are not all oriented in a particular central angular direction as in the LTF method and the zone CAV method, the pre-pits and guide grooves adjacent thereto are exposed with laser beams having Gaussian distributions. Therefore, the laser beam for exposing the pre-pits and the laser beam for exposing the guide grooves partly overlap each other. This leads to a problem that a portion of a guide groove that is adjacent to a pre-pit is different in shape from a portion of a guide groove not adjacent to a pre-pit, and also to a problem that the groove signals produced at internal groove surfaces become non-uniform.

A further problem in the prior art apparatus and method for optical master disk exposure is that, since the change in the shape of the guide grooves adjacent to the pre-pits increases the cross-talk which is caused by the leakage of adjacent track pre-pit signals into regions where no pre-pits are originally present, the recorded data signal quality is deteriorated.

FIG. 1 shows an example of shapes of the guide groove adjacent to pre-pits in the optical disk stamper produced by a conventional optical master disk exposure apparatus, and is for use in explaining causes for making the cross-talk large. In the region of the guide groove 12 which is adjacent to the pre-pits 11, the guide groove 12 is expanded toward a track side with the pre-pits 11, as shown in FIG. 1. It is considered that, as a result of the above, the laser beam used during playback passes through the region closer to the track with the pre-pits, thus increasing the cross-talk from the adjacent track.

In a conventional method, as a means to overcome the above explained problem, the power level of the laser irradiated is changed between the guide groove adjacent to pre-pits and the guide groove not adjacent to the pre-pits in an attempt to uniformly form the guide groove adjacent to the pre-pits and those not adjacent to the pre-pits.

FIG. 2 shows exposure pulses at the guide groove and the pre-pits of the conventional optical master disk exposure apparatus, for showing the relationship among an index signal, a pre-pit record signal and a guide groove record signal.

In the conventional exposure method, the laser beam to expose the pre-pits and the laser beam to expose the inside or outside of the guide groove are of one set for making the exposure, so that the irradiation power of the laser beam exposing either the inside or the outside thereof adjacent to the pre-pit is so modulated that, in the region adjacent to the pre-pit, the power is lower than that in the region adjacent to the pre-pit. Thus, at the region where the guide groove is adjacent to the pre-pits, the guide groove can be formed uniformly with respect to the guide groove not adjacent to the pre-pits.

However, the guide groove oppositely located with respect to the guide groove that is exposed simultaneously with the pre-pits, with the pre-pits interposed therebetween, that is, the guide groove not exposed with the pre-pits as one set, is exposed by the laser beam having the same power level as that of the laser beam used when exposing the guide groove at the region where the pre-pits are not present. Thus, at the region where a portion of the beam waist of the laser beam for exposing the pre-pits and a beam waist of the laser beam for exposing the guide groove overlap with each other, and this results in the same effects as those observed in the case where the laser irradiating power was large, thus leading to a problem that the shape of the guide groove at one side which is adjacent to the pre-pits becomes different from that of the guide groove at the region not adjacent to the pre-pits as shown in FIG. 1.

SUMMARY OF THE INVENTION

An object of the present invention, therefore, is to overcome the problems existing in the prior art, and to provide an apparatus and method for exposing the optical master disk used for an optical disk mastering process, which permits formation of uniform guide grooves in the entire disk surface, reduction of cross-talk to adjacent tracks by pre-pits, and improvement of signal quality of reproduced signal.

According to one aspect of the invention, there is provided a method for exposing an optical master disk in which a guide groove and pre-pits are simultaneously exposed using different laser beams, the method comprising the steps of:

exposing a guide groove adjacent to an inside or an outside of the pre-pits by using a first power level of a laser beam; and exposing a guide groove not adjacent to the pre-pits by using a second power level of the laser beam having a level higher than that of the first power level.

The first power level may be 70–90% of the second power level.

According to another aspect of the invention, there is provided an apparatus for exposing an optical master disk, the apparatus having an exposure means for exposing a guide groove and pre-pits by different laser beams, the apparatus comprising:

an exposure control means for controlling an exposure voltage of the laser beams in the exposure means and an exposure timing, the exposure control means having:
  a pre-pit designation signal generator which generates a pre-pit designation signal for instructing formation of the pre-pits,
  an index signal generator which generates an index signal produced in synchronization with one rotation of the optical master disk,
  a pre-pit delay designation signal generator which generates a pre-pit delay designation signal delayed by a time corresponding to one cycle of the pre-pit designation signal in accordance with the index signal, and
  a pre-data designation signal generator which generates a pre-data designation signal by taking a logical OR between the pre-pit designation signal and the pre-data designation signal;
a guide groove exposure voltage supplier which, in accordance with the pre-pit designation signal, supplies to the exposure means a guide groove exposure voltage of a first power level when an inside or an outside guide groove adjacent to the pre-pits is exposed and a guide groove exposure voltage of a second power level when a guide groove not adjacent to the pre-pits is exposed; and
a modulator which modulates a laser beam for exposing the guide groove in accordance with the guide groove exposure voltage.

1) When the laser beam for exposing the guide groove exposes the guide groove adjacent to the inside or outside of the pre-pits, the guide groove is exposed by the laser beam of the first power level, and when the laser beam for exposing the guide groove exposes the guide groove not adjacent to the pre-pits, the guide groove is exposed by the laser beam of the second power level which is higher than the first power level.

In this way, the groove shape of the guide groove adjacent to the pre-pits and the groove shape of the guide groove not adjacent to the pre-pits are made uniform. Thus, the guide groove on the surface of the optical disk is uniform.

2) In the case of 1), the level of the first power level is set to 70 to 90% of the level of the second power level. Then, the groove shape of the guide groove adjacent to the pre-pits and the groove shape of the guide groove not adjacent to the pre-pits are made uniform, and the guide groove is made uniform on the surface of the optical disk.

3) The pre-pit designation signal generator generates a pre-pit designation signal for instructing the formation of pre-pits. The index signal generator generates an index signal which is produced in synchronization with one rotation of the optical disk. The pre-pit delay designation signal generator generates the pre-pit designation signal which is delayed by the time corresponding to the one cycle of rotation of the optical disk according to the index signal. The pre-data designation signal generator generates a pre-data designation signal by taking the logical OR between the pre-pit designation signal and the pre-data designation signal.

The guide groove exposure voltage supplier supplies a guide groove exposure voltage of a first power level when the guide groove adjacent to an inside or an outside of the pre-pit is exposed in accordance with the pre-data designation signal, and supplies a guide groove exposure voltage of a second power level when the guide groove not adjacent to an inside or an outside of the pre-pit is exposed. The modulator modulates the laser beam for exposing the guide groove in accordance with the guide groove exposure voltage.

According to the invention, since the power of the laser beam for exposing the guide groove is set to different levels for the inside or outside of the guide groove adjacent to the pre-pits and the guide groove not adjacent to the pre-pits, the shape of the guide groove adjacent to the pre-pits and the shape of the guide groove not adjacent to the pre-pits are made uniform. Thus, the guide groove on the surface of the disk is uniform.

4) In the case of 3), the modulator may employ an acousto-optic modulator or an electro-optic modulator.

BRIEF DESCRIPTION OF THE DRAWINGS

The above and other objects, features and advantages of the present invention will be apparent from the following description of a preferred embodiment of the invention explained with reference to the accompanying drawings, in which.

PREFERRED EMBODIMENT OF THE INVENTION

Now, a preferred embodiment of the invention is explained with reference to FIGS. 3 to 5.

Figure 1:
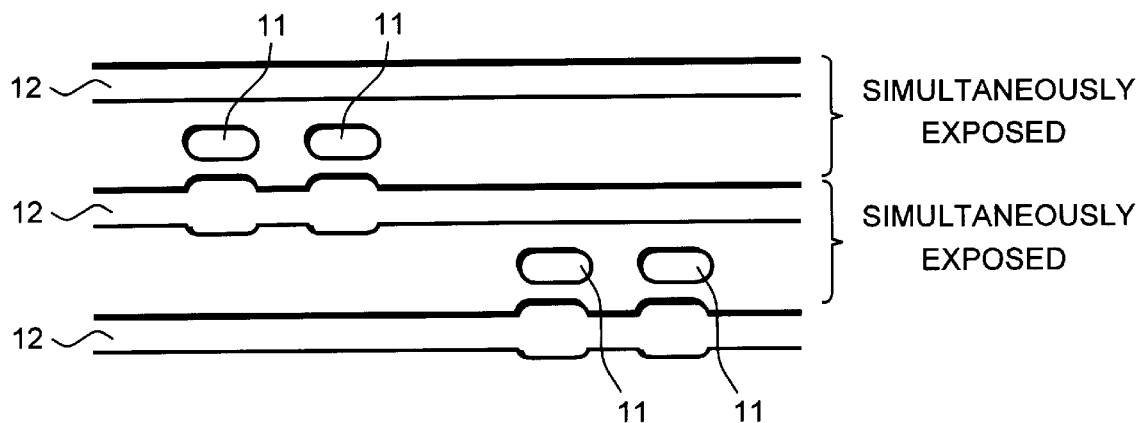
FIG. 1 is a view showing a model of the shape of guide grooves adjacent to pre-pits of an optical disk stamper produced by a prior art exposure method.
Figure 2:
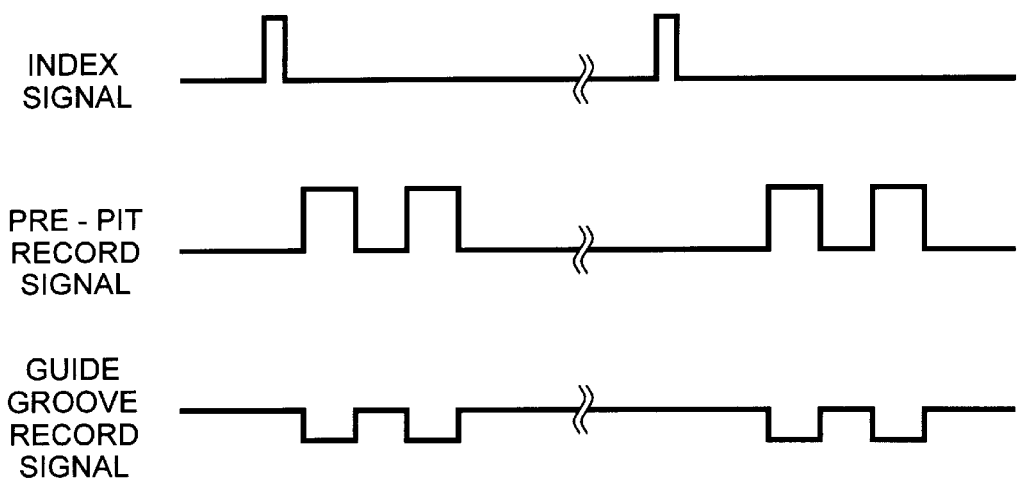
FIG. 2 is a waveform diagram showing exposure pulses for exposing pre-pits and grooves with a typical prior art optical master disk exposure apparatus.
Figure 3:
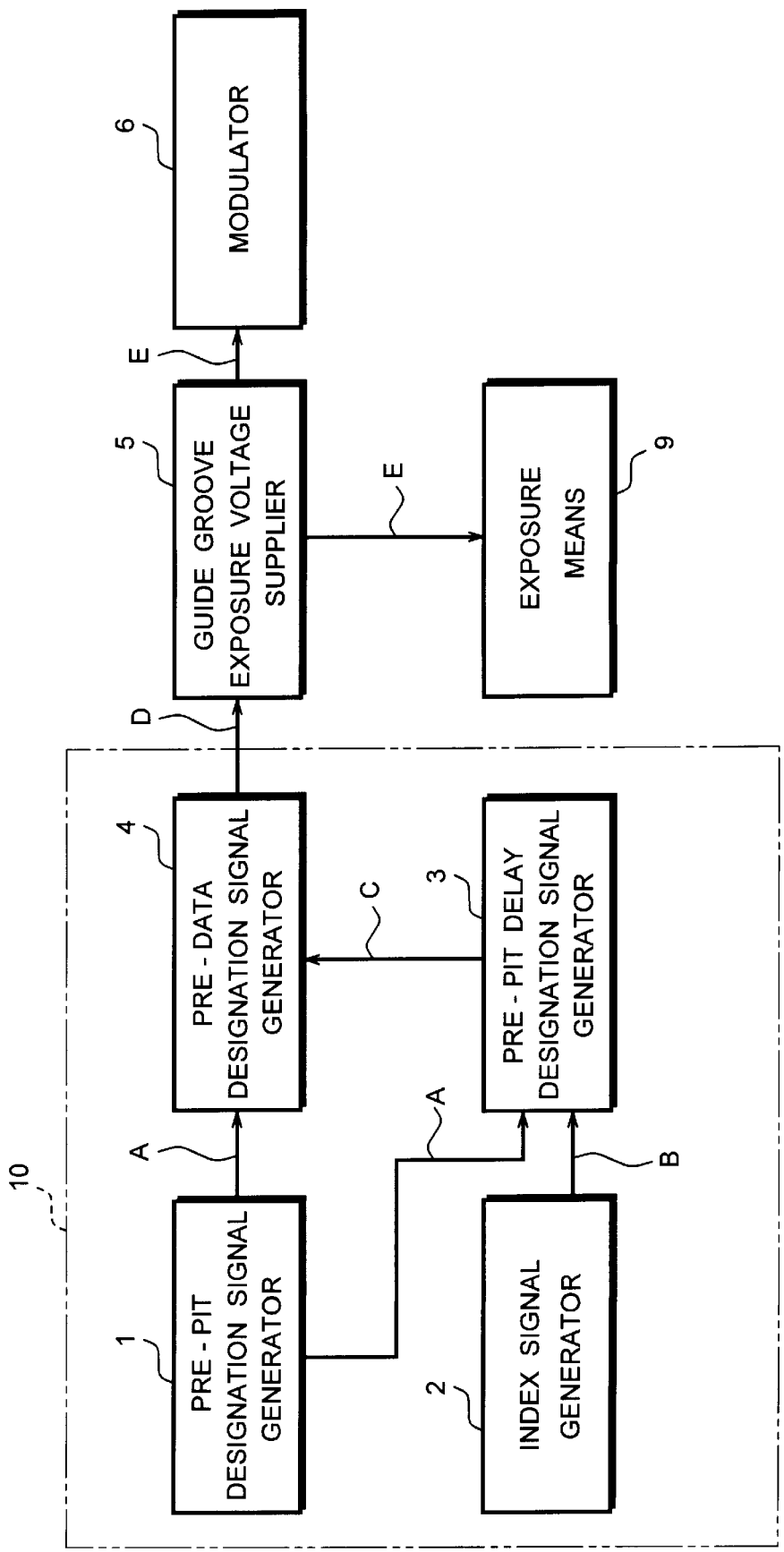
FIG. 3 is a block diagram showing an embodiment of the optical master disk exposure apparatus according to the invention.

FIG. 3 shows, in a block diagram, an optical master disk exposure apparatus as an embodiment according to the invention. The apparatus of the illustrated embodiment comprises an exposure means 9 which simultaneously exposes the guide groove and the pre-pits with different laser beams, and an exposure control means 10 which controls both the exposure voltage and the exposure timing of the laser beam in the exposure means 9.

The exposure control means 10 includes a pre-pit designation signal generator 1 which generates a pre-pit designation signal "A" for instructing the formation of pre-pits, an index signal generator 2 which generates an index signal "B" that is produced in synchronization with one rotation of the optical disk, a pre-pit delay designation signal generator 3 which delays the pre-pit designation signal by the time corresponding to the one cycle of rotation of the optical disk according to the index signal "B" so as to produce a pre-pit delay designation signal "C", and a pre-data designation signal generator 4 which generates a pre-data designation signal "D" by taking the logical OR between the pre-pit designation signal "A" and the pre-data designation signal "D".

In association with the exposure means 9, there are provided a guide groove exposure voltage supplier 5 and a modulator 6. The guide groove exposure voltage supplier 5 supplies, in accordance with the pre-data designation signal "D", to the exposure means 9 with a guide groove exposure voltage of a first power level when an inside or an outside guide groove adjacent to the pre-pits is exposed and with a guide groove exposure voltage of a second power level when a guide groove not adjacent to the pre-pits is exposed. The modulator 6 modulates the laser beam for exposing the guide grooves in accordance with the guide groove exposure voltage "E" from the guide groove exposure voltage supplier 5.

In the optical master disk exposure apparatus according to the embodiment, the laser beam for exposing the guide groove is so positioned that it is delayed with respect to the laser beam for exposing the pre-pits in the exposure advancing direction. For example, in the case where the exposure is effected from the outer side to the inner side of the optical disk, the laser beam for exposing the guide groove is positioned inside the laser beam for exposing the pre-pits.

Figure 4:
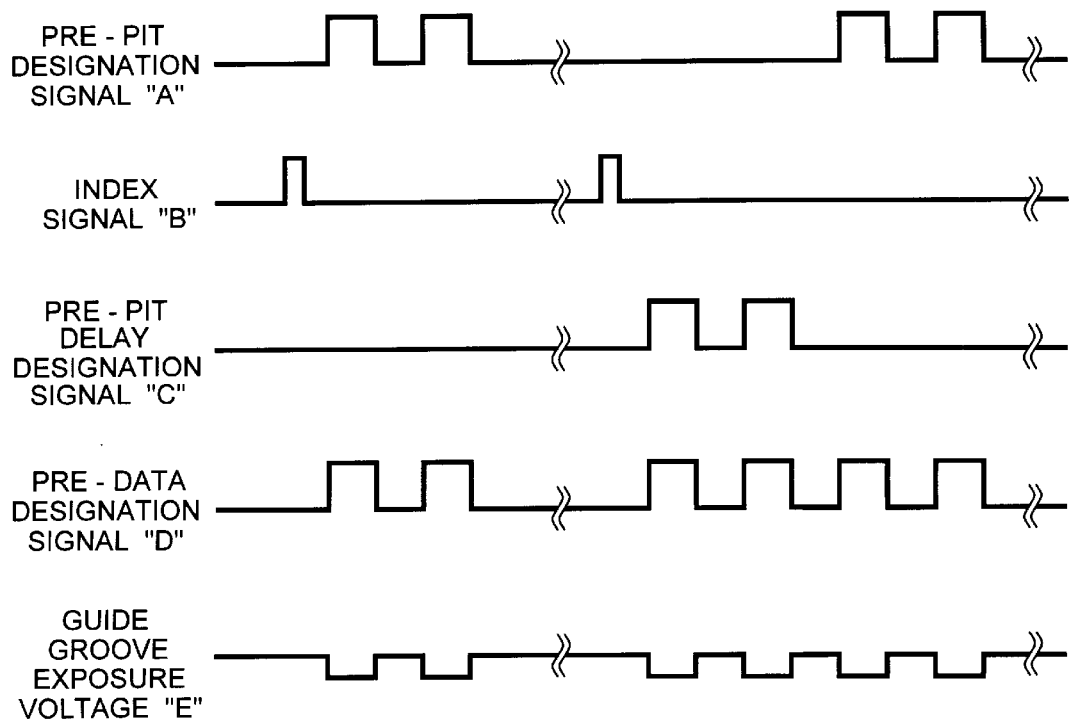
FIG. 4 is a waveform diagram showing waveforms appearing in various parts of a guide groove exposure control circuit in the optical master disk exposure apparatus shown in FIG. 3.

FIG. 4 shows waveforms appearing in various parts of a the guide groove exposure control circuit of the embodiment shown in FIG. 3. The operation of the guide groove exposure control circuit shown in FIG. 3 is explained with reference to the waveforms shown in FIG. 4.

The pre-pit designation signal generator 1 generates a pre-pit designation signal "A" corresponding to the data to be recorded in the optical disk with a predetermined data format, and supplies it to the pre-pit delay designation signal generator 3 and the pre-data designation signal generator 4.

The index signal generator 2 generates an index signal "B" which is produced in synchronization with one rotation of the spindle for rotating the optical disk, that is, one rotation of the optical disk, and supplies it to the pre-pit delay designation signal generator 3.

The pre-pit delay designation signal generator 3 generates the pre-pit delay designation signal "C" by delaying the pre-pit designation signal "A" in accordance with the index signal "B" by the time corresponding to one cycle thereof, and supplies it to the pre-data designation signal generator 4. Therefore, the pre-pit delay designation signal "C" is delayed by the time corresponding to the one cycle of rotation of the optical disk from the pre-pit designation signal "A".

The pre-data designation signal generator 4 generates a pre-data designation signal "D" by taking the logical OR between the pre-pit designation signal "A" and the pre-pit delay designation signal "C", and supplies it to the guide groove exposure voltage supplier 5.

The guide groove exposure voltage supplier 5 generates the guide groove exposure voltage "E" corresponding to the pre-data designation signal "D", and supplies it to the modulator 6. The guide groove exposure voltage "E" is amplitude-modulated so that the amplitude becomes 100% when the-pre-data designation signal "D" is low level, and that the amplitude becomes 70 to 90% when the pre-data designation signal "D" is high level.

The modulator 6 with the A/O modulator (acousto-optic modulation element) or the E/O modulator (electro-optic modulation element) modulates in accordance with the guide groove exposure voltage "E", and generates the modulation beam for exposing the optical master disk.

Figure 5:
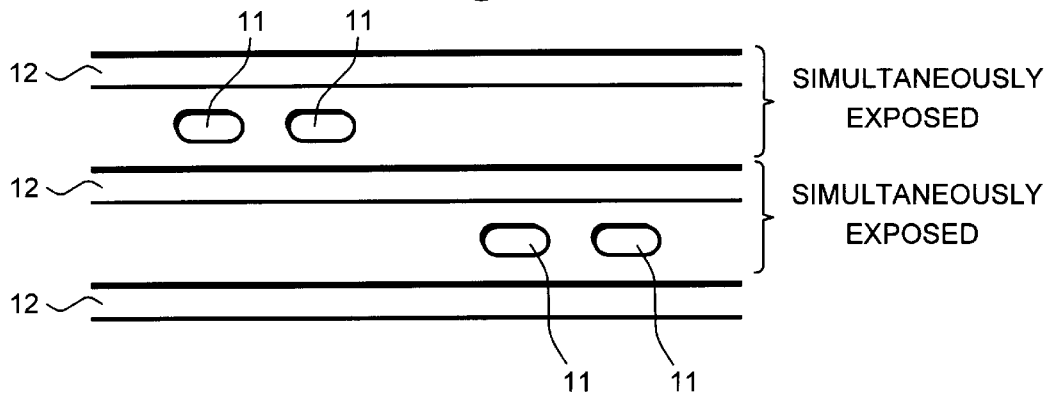
FIG. 5 is a view showing a model of the shape of guide grooves adjacent to pre-pits and grooves of an optical disk stamper produced in the embodiment of the optical master disk exposure method.

FIG. 5 shows an example of shapes of the guide groove 12 adjacent to the pre-pits 11 in the optical disk stamper produced by the optical master disk exposure apparatus according to the invention.

As shown in FIG. 5, both the guide groove adjacent to the pre-pits and the guide groove not adjacent to the pre-pits of the optical disk produced by using the optical master disk exposure apparatus according to the invention, are made uniform. Thus, it is possible to produce the optical disk in which cross-talk is substantially eliminated.

The reason that the guide groove of each side of the pre-pit and the guide groove not adjacent to the pre-pit result in the same groove shape is explained below.

In the method according to the prior art, the exposure of the guide grooves on both the sides of the pre-pits are made by irradiating the laser beam of the same power level as for the guide groove in the region where no pre-pits are present and, because the Gaussian distribution of the laser beam used to expose the pre-pits and the guide grooves, there occurs an overlap between a beam waist portion of the laser beam exposing the guide grooves and a beam waist portion of the laser beam exposing the pre-pits. As a result, the shapes of the guide grooves adjacent to the pre-pits become different from the shapes of the guide grooves not adjacent to the pre-pits.

In contrast to the above, in the method according to the invention, the intensity of the laser beam for exposing both the sides of the guide grooves adjacent to the pre-pits is made lower than that for the remaining region so that the intensity of the laser beam at the region where the two laser beams respectively exposing the pre-pits and the guide grooves and the region not adjacent can be made the same power level as the intensity of the laser beam exposing the region to which the pre-pits are not adjacent. Thus, the groove shapes in the guide grooves on both the sides of the pre-pits can be made the same as the groove shapes in the guide grooves not adjacent to the pre-pits.

According to the invention, in the method and apparatus for exposing the optical master disk wherein the guide groove and the pre-pits are exposed simultaneously by two different laser beams, the power level of the laser beam for exposing the guide groove is made such that the level in the case where the pre-pits are present either at the inside or the outside of the guide groove is differentiated from the level in the case where the pre-pits are not present either at the inside or the outside of the guide groove. In this way, the groove shape of the guide groove adjacent to the pre-pits and that of the guide groove not adjacent to the pre-pits are made uniform, hence the guide grooves are made uniform on the surface of the optical disk.

According to the invention, since the groove shape of the guide groove can be made uniform on the disk surface, it is possible to suppress the cross-talk, that is, the leakage of the pre-pits signals into the adjacent track, and this enables the enhancement of the quality of the data signal from the optical disk medium and the provision of the improved method and apparatus for exposing the optical master disk over the prior art.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A method for exposing an optical master disk in which a guide groove and pre-pits are simultaneously exposed using different laser beams, the method comprising the steps of:

exposing a guide groove adjacent to an inside or an outside of said pre-pits using a first power level of a laser beam;

exposing a guide groove not adjacent to said pre-pits using a second power level of said laser beam having a level higher than that of said first power level; and exposing the guide grooves adjacent to those pre-pits that have been exposed to a preceding rotation of said optical master disk, using said first power level of said laser beam so that the intensity of the laser beam at the region where the two laser beams respectively expose the pre-pits and the guide grooves and the region not adjacent are at the same power level as the intensity of the laser beam exposing the region to which the pre-pits are not adjacent.

2. A method for exposing an optical master disk according to claim 1, wherein said first power level is controlled to be 70–90% of said second power level.

3. A method for exposing an optical master disk in which a guide groove and pre-pits are simultaneously exposed using different laser beams, the method comprising the steps of:

exposing a guide groove adjacent to an inside or an outside of said pre-pits using a first power level of a laser beam;

exposing a guide groove not adjacent to said pre-pits using a second power level of said laser beam having a level higher than that of said first power level; and exposing the guide grooves adjacent to those pre-pits that have been exposed to a preceding rotation of said optical master disk, using said first power level of said laser beam, wherein said first power level and said second power level are controlled by:

generating a pre-pit designation signal for instructing formation of said pre-pits;

generating an index signal produced in synchronization with one rotation of said optical master disk;

generating a pre-pit delay designation signal delayed by a time corresponding to one cycle of said pre-pit designation signal in accordance with said index signal; and generating a pre-data designation signal by taking a logical OR between said pre-pit designation signal and said pre-data designation signal.

* * * * *